(12) United States Patent
Wu

(10) Patent No.: US 10,221,932 B2
(45) Date of Patent: Mar. 5, 2019

(54) GEAR WHEEL HAVING HELICAL TOOTHING AND SEGMENT FOR A GEAR WHEEL

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 15/237,296

(22) Filed: Aug. 15, 2016

(65) Prior Publication Data

US 2017/0191557 A1 Jul. 6, 2017

Related U.S. Application Data

(63) Continuation of application No. 14/237,301, filed as application No. PCT/EP2012/003038 on Jul. 19, 2012, now Pat. No. 9,416,862.

(30) Foreign Application Priority Data

Aug. 5, 2011 (DE) .......... 10 2011 109 533
Oct. 9, 2011 (CN) .......... 2011 2 0379988 U

(51) Int. Cl.
*F16H 55/12* (2006.01)
*F16H 55/17* (2006.01)

(52) U.S. Cl.
CPC ............ *F16H 55/17* (2013.01); *F16H 55/12* (2013.01); *Y10T 74/1987* (2015.01)

(58) Field of Classification Search
CPC .......................... F16H 55/12; Y10T 74/1993
See application file for complete search history.

(56) References Cited

U.S. PATENT DOCUMENTS

| 752,898 | A | * | 2/1904 | Fogarty | F16H 55/12 |
| | | | | | 492/38 |
| 826,757 | A | * | 7/1906 | Waterfield | F16H 55/46 |
| | | | | | 474/902 |
| 3,742,779 | A | | 7/1973 | Shaver | |
| 3,996,814 | A | * | 12/1976 | Westlake | F16G 13/04 |
| | | | | | 474/162 |

(Continued)

FOREIGN PATENT DOCUMENTS

| BR | PI1105060 A2 | 11/2013 |
| CN | 201344244 Y | 11/2009 |

(Continued)

OTHER PUBLICATIONS

International Search Report and Written Opinion, dated Oct. 4, 2012, in International application No. PCT/EP2012/003038. (English-language translation).

(Continued)

*Primary Examiner* — William Kelleher
*Assistant Examiner* — Gregory T Prather
(74) *Attorney, Agent, or Firm* — Hunton Andrews Kurth LLP

(57) ABSTRACT

A gear wheel includes helical toothing, and a segment for a gear wheel which is made up of segments, each segment having a toothing section having helical toothing, the toothing section being joined to a retaining section.

14 Claims, 4 Drawing Sheets

(56) References Cited

U.S. PATENT DOCUMENTS

| | | | |
|---|---|---|---|
| 4,077,274 A * | 3/1978 | Johnson | F16H 55/12 |
| | | | 74/425 |
| 4,465,411 A * | 8/1984 | Boyce, Jr. | B23F 21/10 |
| | | | 228/119 |
| 4,669,165 A | 6/1987 | Maghon | |
| 4,964,842 A * | 10/1990 | Howard | F16H 55/12 |
| | | | 474/152 |
| 5,890,814 A | 4/1999 | Catlett | |
| 6,074,316 A | 6/2000 | Murrietta, Sr. | |
| 2004/0187637 A1* | 9/2004 | Gokan | F16F 15/26 |
| | | | 74/596 |
| 2009/0158876 A1* | 6/2009 | Sollars | F16H 55/12 |
| | | | 74/462 |
| 2010/0178103 A1* | 7/2010 | Raszkowski | F16C 35/063 |
| | | | 403/315 |

FOREIGN PATENT DOCUMENTS

| | | |
|---|---|---|
| DE | 10 2006 026 085 B3 | 12/2007 |
| DE | 10 2008 054 189 A1 | 7/2010 |
| JP | S49-113060 A | 10/1974 |
| JP | S57-83756 A | 5/1982 |
| JP | S59-187107 A | 10/1984 |
| JP | H04-129621 A | 4/1992 |
| WO | WO2010/060505 * | 3/2010 |

OTHER PUBLICATIONS

International Preliminary Report on Patentability, dated Feb. 11, 2014, in International application No. PCT/EP2012/003038. (English-language translation).

* cited by examiner

GEAR WHEEL HAVING HELICAL TOOTHING AND SEGMENT FOR A GEAR WHEEL

CROSS REFERENCE TO RELATED APPLICATIONS

This application is a continuation of U.S. patent application Ser. No. 14/237,301 filed on Feb. 5, 2014, which is a national phase of International Application No. PCT/EP2012/003038 filed on Jul. 19, 2012, which claims priority to German Patent Application No. 10 2011 109 533.4 filed on Aug. 5, 2011 and to Chinese Patent Application No. 201120379988.9 filed on Oct. 9, 2011, each of which is expressly incorporated herein in its entirety by reference thereto.

FIELD OF THE INVENTION

The present invention relates to a gear wheel having helical toothing and a segment for a gear wheel.

BACKGROUND INFORMATION

It is conventional to provide gear wheels with external toothing.

SUMMARY

Example embodiments of the present invention reduce the generation of noise when the gear teeth are meshing.

Among features of example embodiments of the invention with regard to the gear wheel having helical toothing and made up of segments are that each segment has a toothing section having helical toothing, the toothing section being joined to a retaining section.

The advantage in this context is that with the aid of the helical toothing with a meshing toothing part, torque is able to be transmitted fairly silently, even though the gear wheel is made up of segments.

The reason is that in the case of a conventional segmented gear wheel, the gear wheel is made up of segments in the circumferential direction, each segment representing a circumferential section, thus, an angle-at-circumference range of the gear wheel. The segment is, as it were, cut out from the gear wheel with the aid of a sectional plane that extends in the axial and in the radial direction from the gear-wheel axis. Therefore, the toothing must be implemented as spur toothing, since otherwise, teeth would be cut into, thus resulting in the danger of tooth rupture.

In example embodiments of the present invention, on the other hand, helical toothing is provided on a toothing section. The toothing section is cut off or bounded along a tooth space. In this manner, low-noise operation of the gear wheel is made possible, even though the toothing section has a boundary surface which extends with a helix angle in accordance with the helix angle of the toothing. According to example embodiments of the present invention, such boundary surfaces of adjacent segments are set apart, thus, are implemented without transmission of force, and the interconnection or the associated distribution of force is achieved only in the area of the connecting surfaces which are located on the retaining sections.

However, the retaining sections are bounded by a sectional plane that extends exclusively radially and axially, thus, not in the circumferential direction. The connecting surfaces are implemented correspondingly. Thus, they extend only in the radial and axial direction.

The toothing section and the retaining section may be provided in one piece. This is advantageous, because the segment exhibits high loadability and is able to be machined in a clamping, and therefore the spacing of the boreholes relative to the toothing may also be produced very precisely.

The toothing may be an external toothing. This offers the advantage of easy manufacture.

At its end areas disposed in the circumferential direction, the toothing section in each instance may have a first boundary surface which faces the adjacent segment and which extends parallel to a tooth space in the toothing, in particular, the first boundary surface extending in the radial direction and along a helical line whose helical axis is the gear-wheel axis and whose helix angle corresponds to the helix angle of the toothing. This is advantageous because a helical toothing is able to be provided in the toothing section, which extends without interrupted teeth and is therefore very loadable.

The toothing section may project—especially with a section containing one section of the first boundary surface—in the circumferential direction beyond the retaining section.

in particular, the toothing section extending—especially with another section containing another section of the first boundary surface—less far in the circumferential direction than the retaining section. The advantage in this context is that in its end area lying in the circumferential direction, the retaining section is cut off or bounded differently than the toothing area. The reason is that the retaining section is bounded at one circumferential position, thus extends here with its end face only in the radial and axial direction; however, the toothing section is restricted in accordance with a helical toothing, thus, extends in conformance with a helical line and radially from the gear-wheel axis.

A first distance may be provided between the first boundary surfaces of two adjacent segments. This offers the advantage that no direct transmission of force takes place between the toothing sections of two adjacent segments.

The retaining section may have a connecting surface, against which the corresponding connecting surface of the respective adjacent segment is pressed with the aid of connecting screws. This is advantageous in that force is transferred between the retaining sections, and in doing this, the connecting surfaces contact each other at one circumferential position and are able to be pressed against each other by the connecting screws for the transfer of force.

The connecting surface may extend in the radial direction and in the axial direction, but especially not in the circumferential direction, thus, in particular, is located at one unique circumferential position. This is advantageous, because the connecting surface may be produced easily and inexpensively.

The retaining sections of two respective adjacent segments may be screw-connected by at least two connecting screws, one screw being provided for aligning the segments relative to each other, in particular, the connecting surface having a borehole, through which the screw is passed for the alignment. This is advantageous because it allows an exact alignment and then a subsequent tightening of the screws. Thus, force is allowed to be transferred between the retaining sections and not between the toothing sections.

The retaining section may be disposed within a smaller radial-distance range than the toothing section. This is advantageous because the retaining section supports the radially external-mounted toothing section, and the connecting screws between retaining sections do not break through or otherwise impair the toothing of the gear wheel, since they are also located at smaller radial distance than the toothing section.

The retaining section may have a connecting section for connection to a drum or shaft, the gear wheel being disposed at greater radial distance than the drum or shaft. This is advantageous because a drum is able to be provided with a large gear wheel at its outer circumference, thereby permitting great torque to be transmitted.

The retaining section may have a second boundary surface which extends in the circumferential direction and in the axial direction and stands radially opposite the radial inner side of the section of the toothing section of the adjacent segment projecting in the circumferential direction beyond the associated retaining section, a second distance being provided between the second boundary surface and the inner side of the projecting section. This offers the advantage that no force is transferred between adjacent toothing sections.

The quotient of the first distance and the outside diameter of the gear wheel may be less than 0.0005, especially less than 0.00025 or even less than 0.000125, and/or the quotient of the second distance and the outside diameter of the gear wheel may be less than 0.0005, especially less than 0.00025 or even less than 0.000125. The advantage in this case is that within the context of manufacturing tolerances and thermally caused expansions, a transfer of force is reliably preventable, and low-noise operation is made possible in spite of the distances. The reason is that the distances are outside of the meshing area of the teeth, since the slit produced by the distances runs along the tooth space, thus especially the bottom of the tooth space.

The retaining section may have two spoke sections which are connected by a rib section extending in the circumferential direction, the spoke sections being located in the retaining-section end areas lying in the circumferential direction, and in each case having a connecting surface, in particular, the spoke sections extending substantially in the radial direction and in the axial direction, in particular, the rib section extending substantially in the radial direction and in the circumferential direction, in particular, the rib section having at least one cutout. This is advantageous because high stability is attainable with small mass.

Among features with regard to the segment are that the segment is produced from ADI or GGG cast steel. This offers the advantage that the toothing is capable of being highly loaded. The reason is that ADI is a material based on cast iron with nodular graphite. Owing to a special heat treatment, great strength accompanied by good strain and high resistance to wear accompanied by consistently good damping are achieved.

The projecting area of the toothing section, thus the area of the toothing section protruding the retaining section in the circumferential direction, is therefore capable of being loaded, since ADI exhibits great strength. The toothing in this area thus becomes highly loadable, even though the area protrudes.

Example embodiments of the present invention are explained in detail with reference to the Figures.

DETAILED DESCRIPTION

Figure 1:
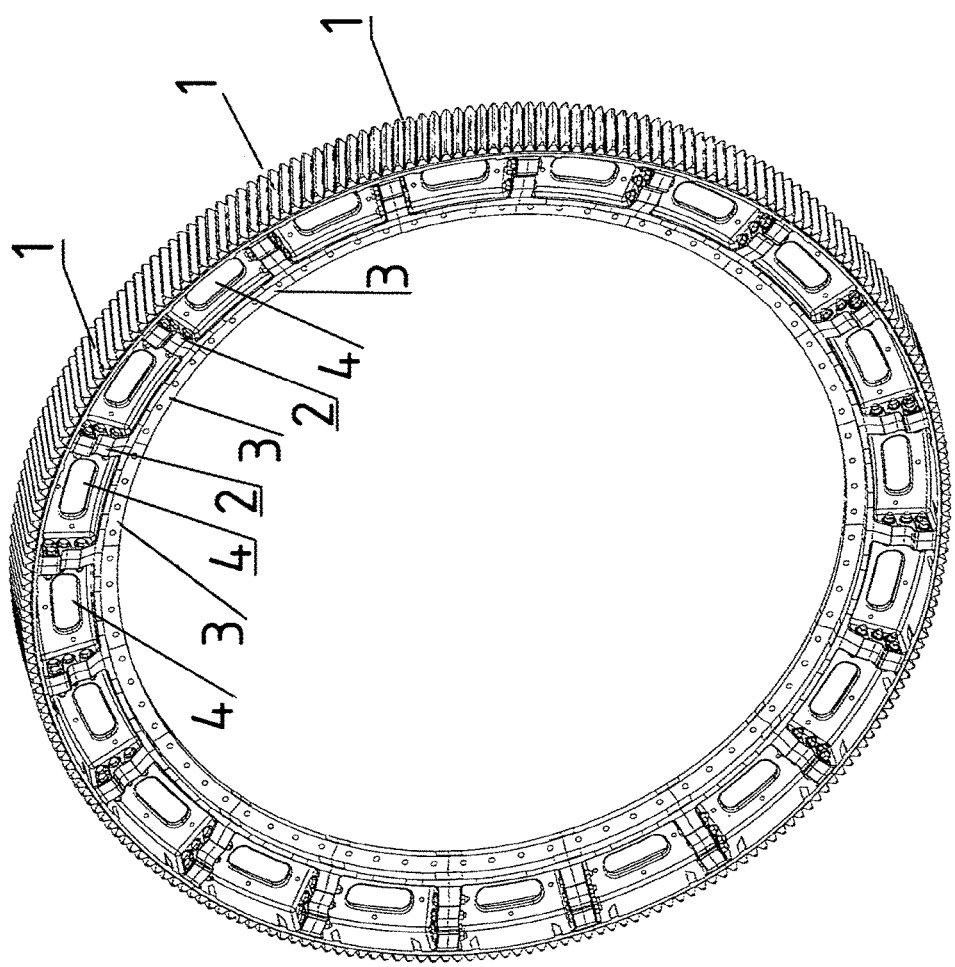
FIG. 1 shows a helical-toothed gear wheel, which is made up of segments disposed one after the other in the circumferential direction.
Figure 2:
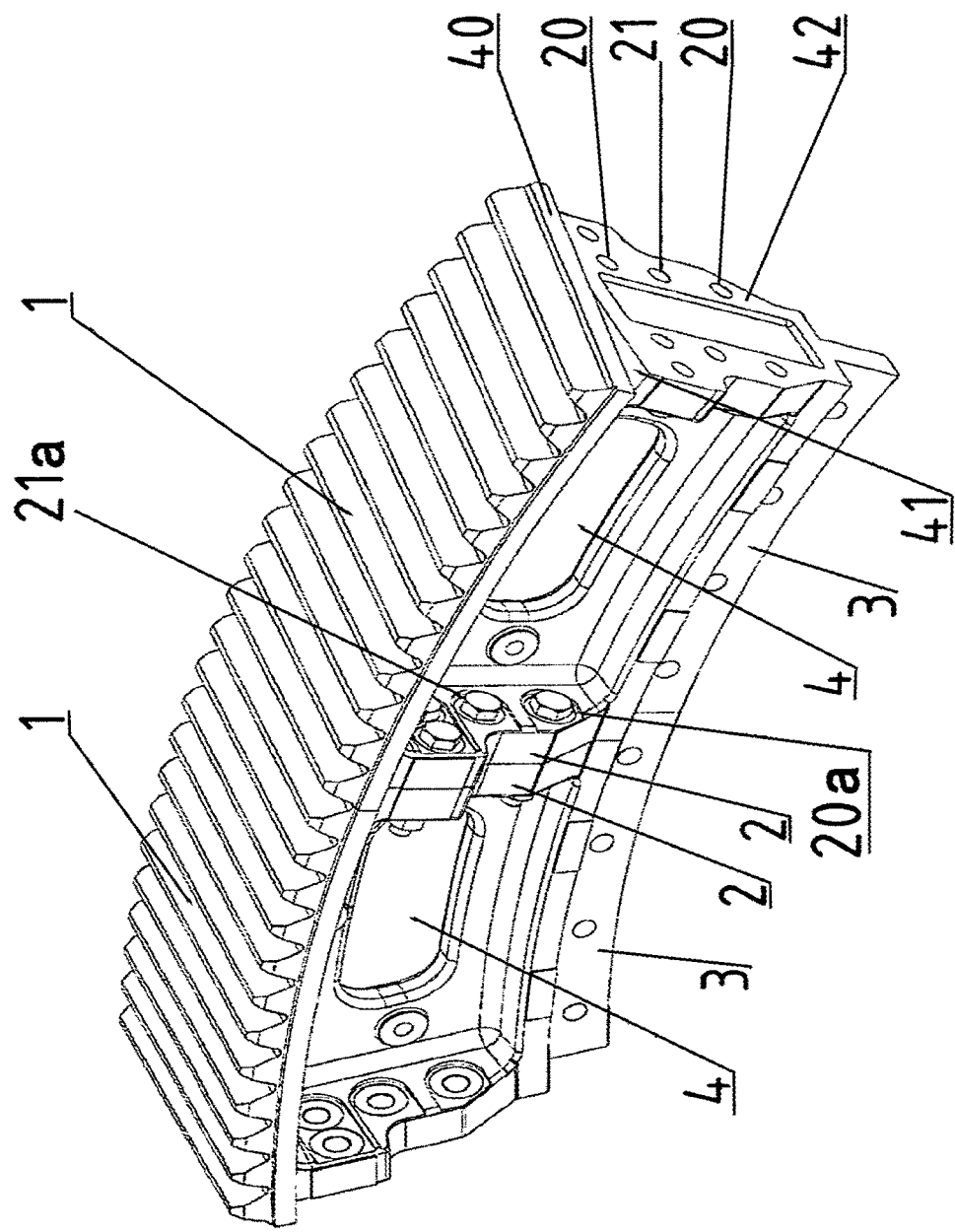
FIG. 2 shows an enlarged section of it.
Figure 3:
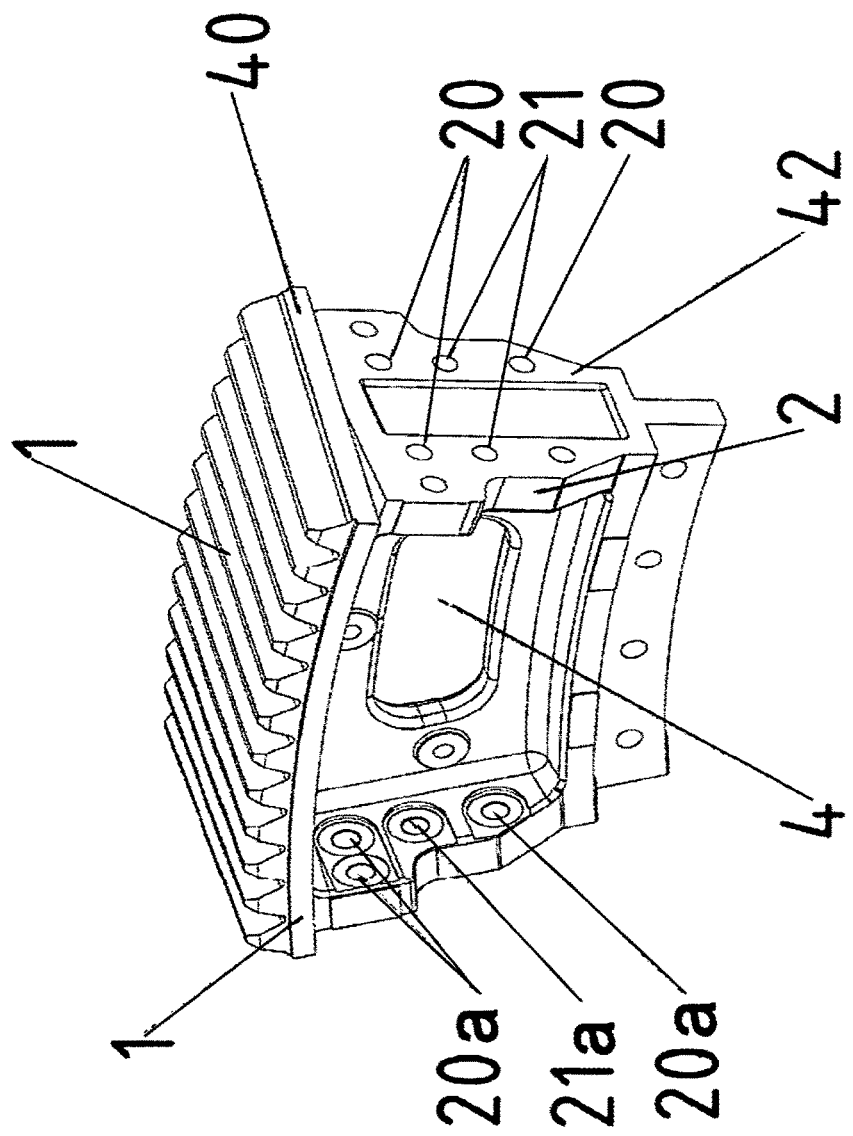
FIG. 3 shows a similar segment, such segments in turn being able to be assembled to form a similar gear wheel. In contrast to FIGS. 1 and 2, in this instance, four instead of three screws are used in the connecting area of two adjacent segments.
Figure 4:
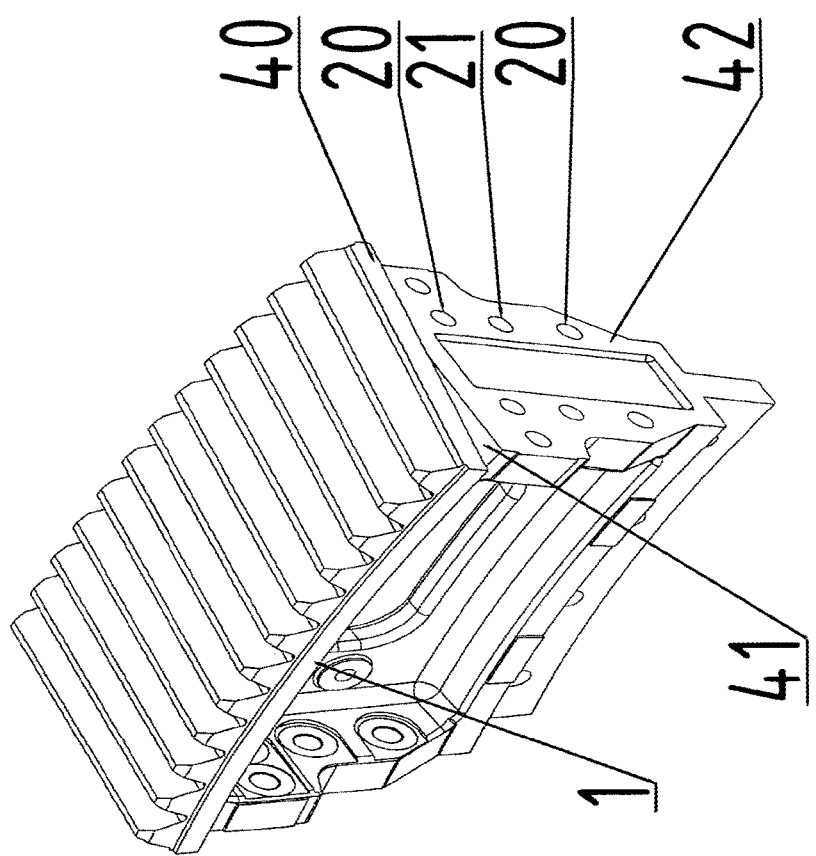
FIG. 4 shows an enlarged section of FIG. 3. In this case, three boundary surfaces are visible, which border on an adjacent segment to be connected in each instance.

Each segment has a toothing section 1, which is formed as a cylinder envelope section provided with external toothing.

Since 14 segments are used in the circumferential direction to put together the gear wheel, toothing sections 1 resemble gear-rack segments, the rack being curved in conformance with the enveloping surface of a cylinder corresponding to the gear wheel.

Toothing sections 1 are thus able to be manufactured by producing an envelope section of a hollow cylinder and incorporating a toothing into its outer side. The envelope section is bounded in the axial direction by two planes, e.g., especially end-face sections of the gear wheel, whose normal extends in the axial direction of the gear wheel. In addition, the toothing section is bounded in the circumferential direction by a screw-like surface which contains all rays extending radially from the gear-wheel axis toward a helical line.

On the radial inner side of the segment, in each case retaining sections are formed that include a connecting section 2 extending in the axial direction, thus the gear-wheel axial direction, and connecting section extending in the circumferential direction having a connecting section 3 likewise extending in the circumferential direction for securing on the outer surface of a drum.

Thus, connecting section 2 has a connecting surface 42, onto which the adjacent segment is screwed with its corresponding connecting surface 42. Connecting surface 42 extends in the radial direction and in the axial direction. Therefore, entire connecting surface 42 is located at one unique position in the circumferential direction, thus, at one angle-at-circumference position.

Boreholes oriented in the circumferential direction are located in the connecting surface. In this case, boreholes 20 are provided for introducing screws by which the respective adjacent segments are pressed against each other. In addition, at least one borehole 21 is also provided for introducing a screw 21*a* to align the segments relative to each other. Therefore, alignment of the segments is made possible prior to the tightening of connecting screws 20*a*. After the alignment has been carried out, connecting screws 20*a* are fastened tightly and thus the relative position of the segments is fixed.

Toothing section 1 has a toothing on its radially outer side. The toothing is implemented as helical toothing. Boundary surface 40, with which toothing section 1 of the segment borders on the corresponding adjacent, is provided along a space in the toothing. Consequently, boundary surface 40 does not cut into any of the teeth. Boundary surface 40 therefore extends in accordance with the helical toothing, thus of a helical-line section, and in the radial direction.

However, since the retaining sections are oriented in purely radial and axial directions (that is, spoke sections 2) or are oriented purely in radial direction and in circumferential direction (that is, rib sections 3), toothing section 1 projects sectionally beyond the retaining section. Thus, at least in a first axial area, toothing section 1 projects beyond connecting surface 42 in the circumferential direction; in a second axial area, toothing section 1 is drawn back in the circumferential direction, so that boundary surface 41 is visible. In this context, boundary surface 41 extends in the axial direction and in the circumferential direction, thus, it has one unique radial distance.

The segments are toleranced and provided such that two adjacent segments contact each other at their connecting surfaces 42, however, a distance is present in the area of boundary surfaces 40 and 41. In this context, preferably a distance of less than 1 mm, especially less than 0.5 mm is maintained, given an outside diameter of the gear wheel—made up of the segments—of more than 2 meters, especially of more than 4 meters. Therefore, the quotient of distance and outside diameter is less than 0.0005, especially less than 0.00025 or even 0.000125.

In this manner, changes in distance caused thermally and/or as a result of assembly are also tolerable. This is because force-transmitting connecting surface 42 completely takes on the forces to be transferred between the adjacent segments.

The protruding part of the toothing section covers boundary surface 41 of the adjacent segment, particularly in the radial direction.

Likewise, boundary surfaces 40 of two respective adjacent segments face each other, as viewed in the circumferential direction and also in the axial direction.

LIST OF REFERENCE NUMERALS

1 Toothing section
2 Connecting section
3 Connecting section for drum
4 Cutout
20, 21 Borehole
20a Connecting screw
21a Screw for alignment
40 Boundary surface
41 Boundary surface
42 Connecting surface

What is claimed is:

1. A gear wheel, comprising:
   a plurality of segments; and
   a helical toothing;
   wherein each segment has a toothing section having helical toothing, and the toothing section is joined to a retaining section, wherein the retaining section has a boundary surface which extends in a circumferential direction and in an axial direction;
   wherein at end areas disposed in the circumferential direction, the toothing section in each case has another boundary surface which faces an adjacent segment and extends parallel to a tooth space in the toothing, the other boundary surface extending in a radial direction and along a helical line whose helical axis is a gear-wheel axis and whose helix angle corresponds to a helix angle of the toothing.

2. The gear wheel according to claim 1, wherein the toothing section and retaining section are arranged in one piece.

3. The gear wheel according to claim 1, wherein the toothing includes an external toothing.

4. The gear wheel according to claim 1, wherein the toothing section projects, with a section containing one section of the other boundary surface, in the circumferential direction beyond the retaining section, the toothing section extending, with another section containing another section of the other boundary surface, less far in the circumferential direction than the retaining section.

5. The gear wheel according to claim 1, wherein the retaining section has a connecting surface, against which a corresponding connecting surface of a respective adjacent segment is pressed by connecting screws.

6. The gear wheel according to claim 5, wherein the connecting surface extends in a radial direction and in the axial direction, but not in the circumferential direction, and is located at a single circumferential position.

7. The gear wheel according to claim 1, wherein the retaining sections of two respective adjacent segments are screw-connected by at least two connecting screws, one screw being provided to align the segments relative to each other, the connecting surface having a borehole, through which the screw is passed for alignment.

8. The gear wheel according to claim 1, wherein the retaining section is disposed within a smaller radial-distance range than the toothing section.

9. The gear wheel according to claim 1, wherein the boundary surface stands radially opposite a radial inner side of the section of the toothing section of an adjacent segment projecting in the circumferential direction beyond the associated retaining section.

10. The gear wheel according to claim 1, wherein the retaining section has two spoke sections, which are connected by a rib section extending in the circumferential direction, the spoke sections being located in retaining-section end areas lying in the circumferential direction, and in each case having a connecting surface, the spoke sections extending substantially in a radial direction and in the axial direction, the rib section extending substantially in the radial direction and in the circumferential direction, the rib section having at least one cutout.

11. A segment for a gear wheel according to claim 1, wherein the segment is formed of austempered ductile iron or cast iron.

12. The gear wheel according to claim 1, wherein the segment is formed of spheroidal cast iron.

13. The gear wheel according to claim 1, wherein each segment has the same circumferential length.

14. The gear wheel according to claim 1, wherein the gear wheel is formed of a plurality of identical segments.

* * * * *